INVENTOR
Alan J. Saunders

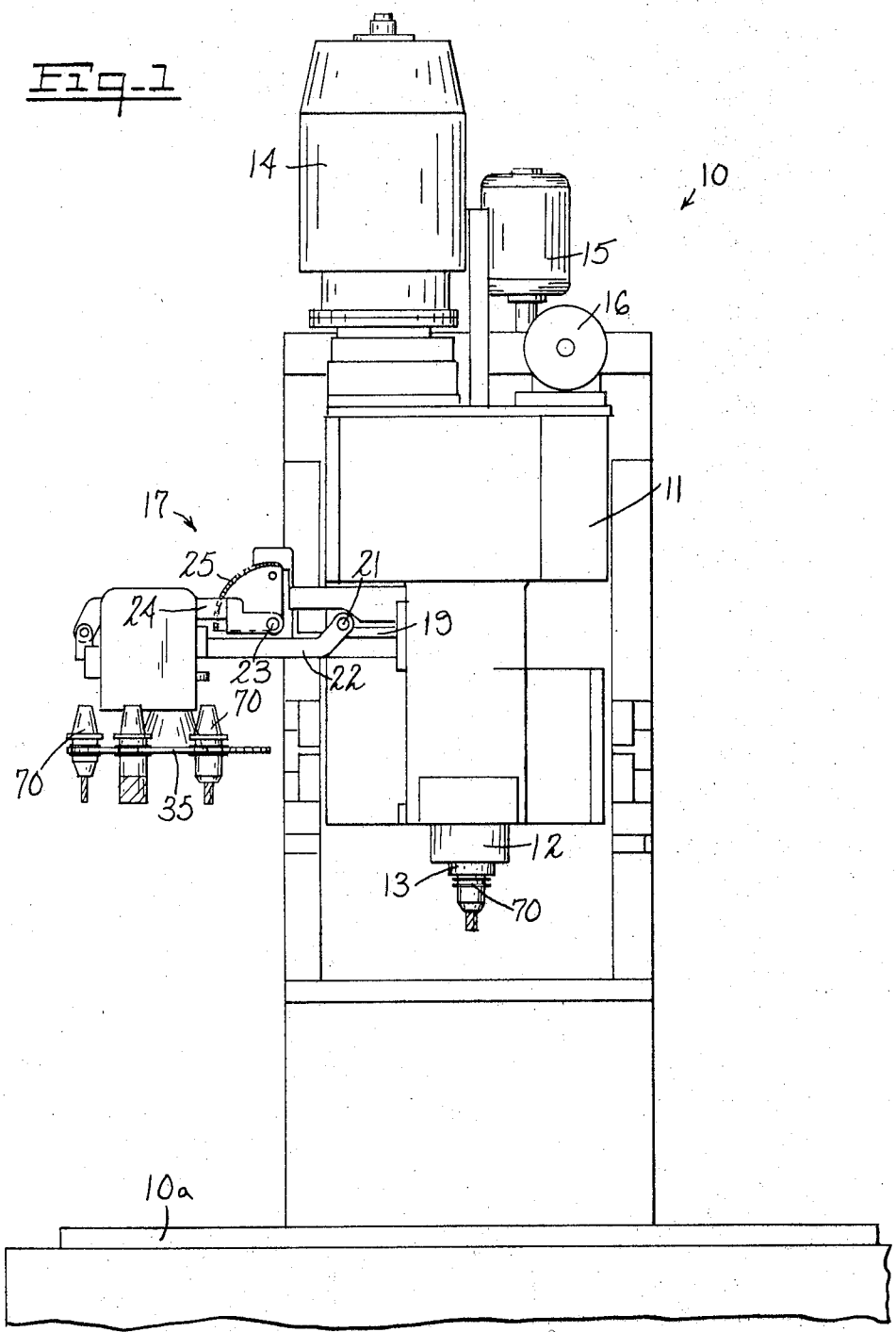

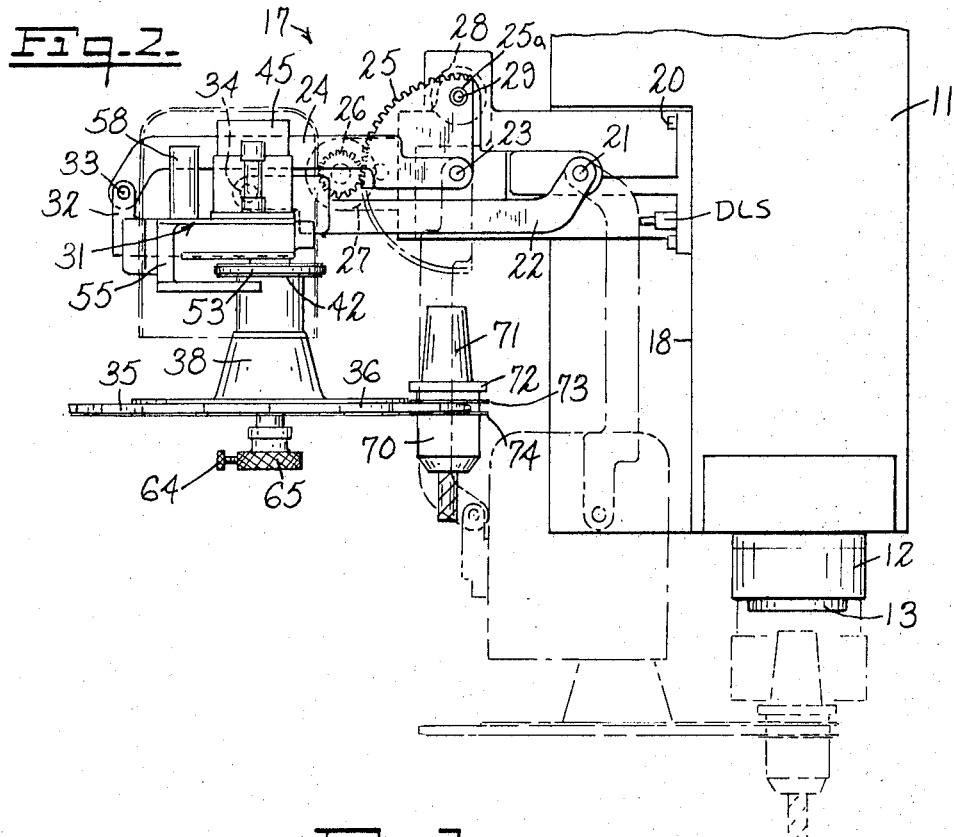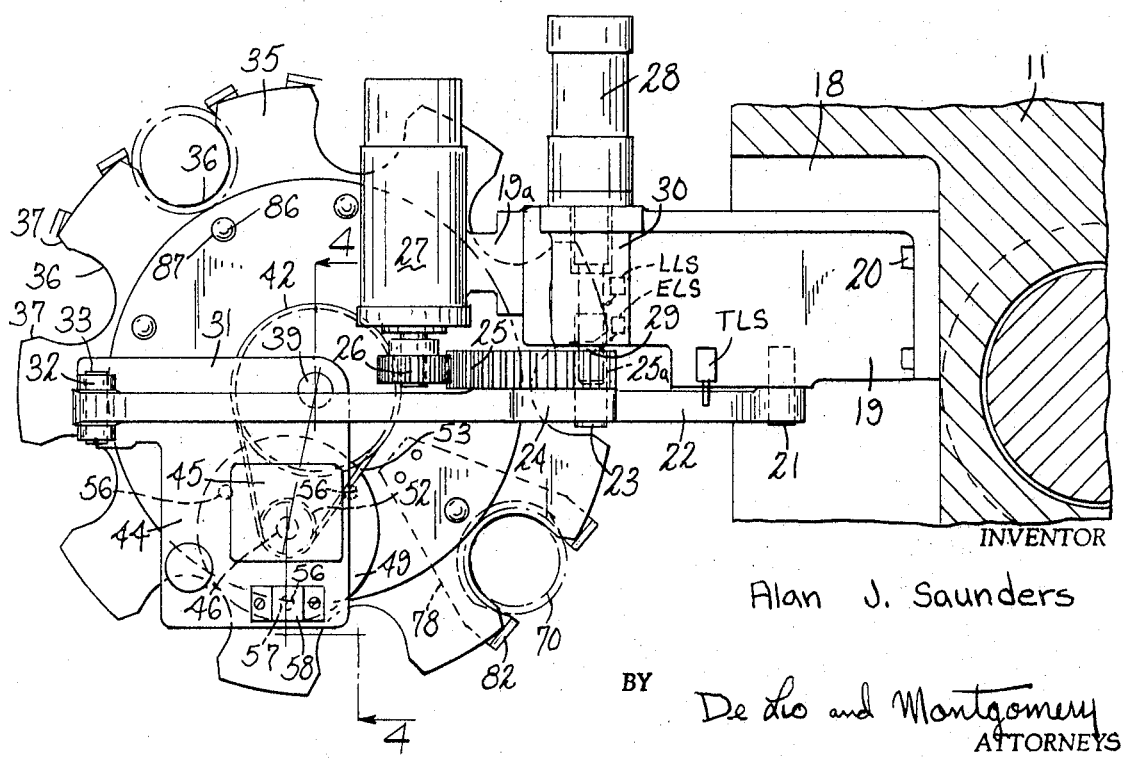

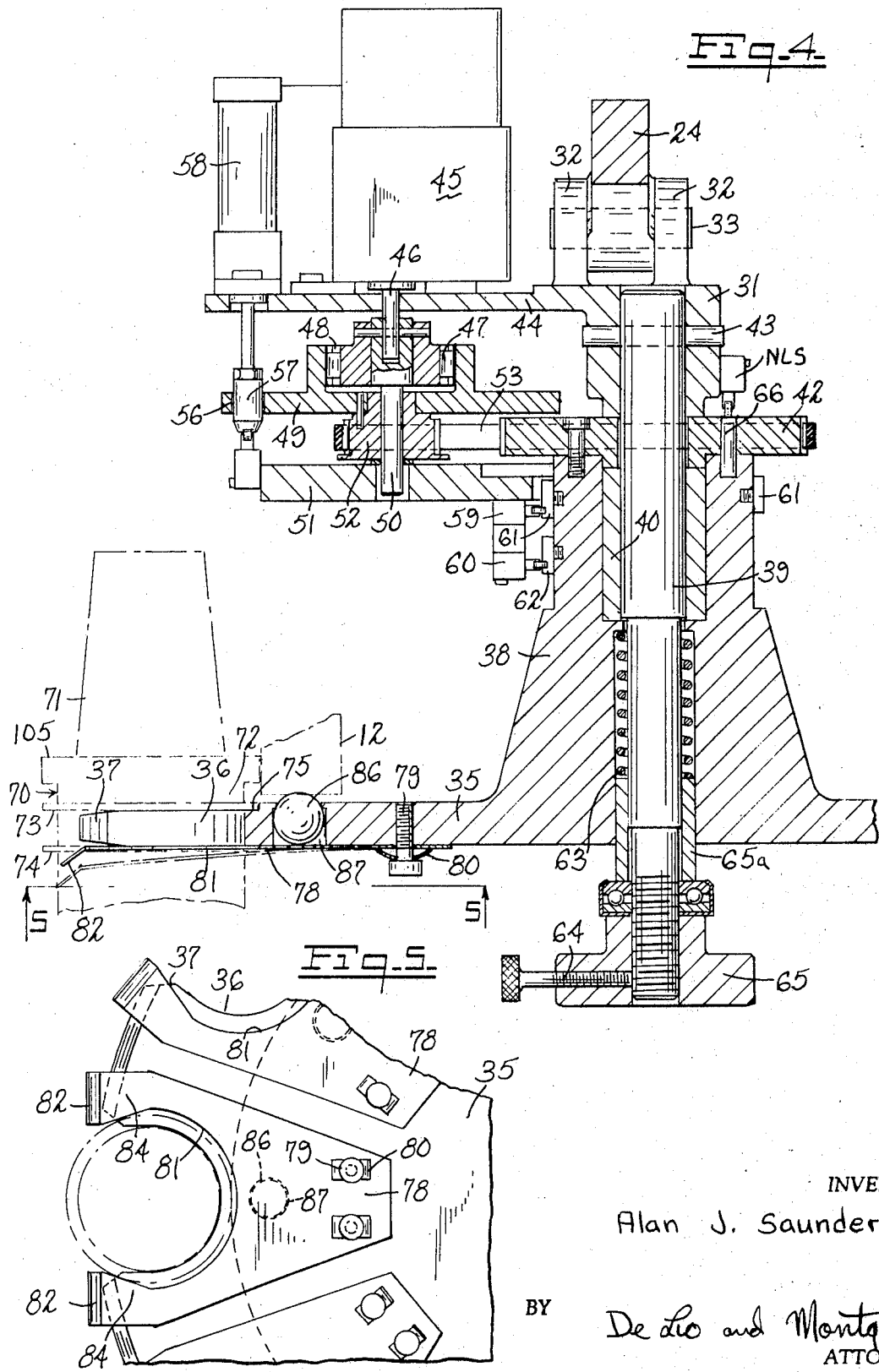

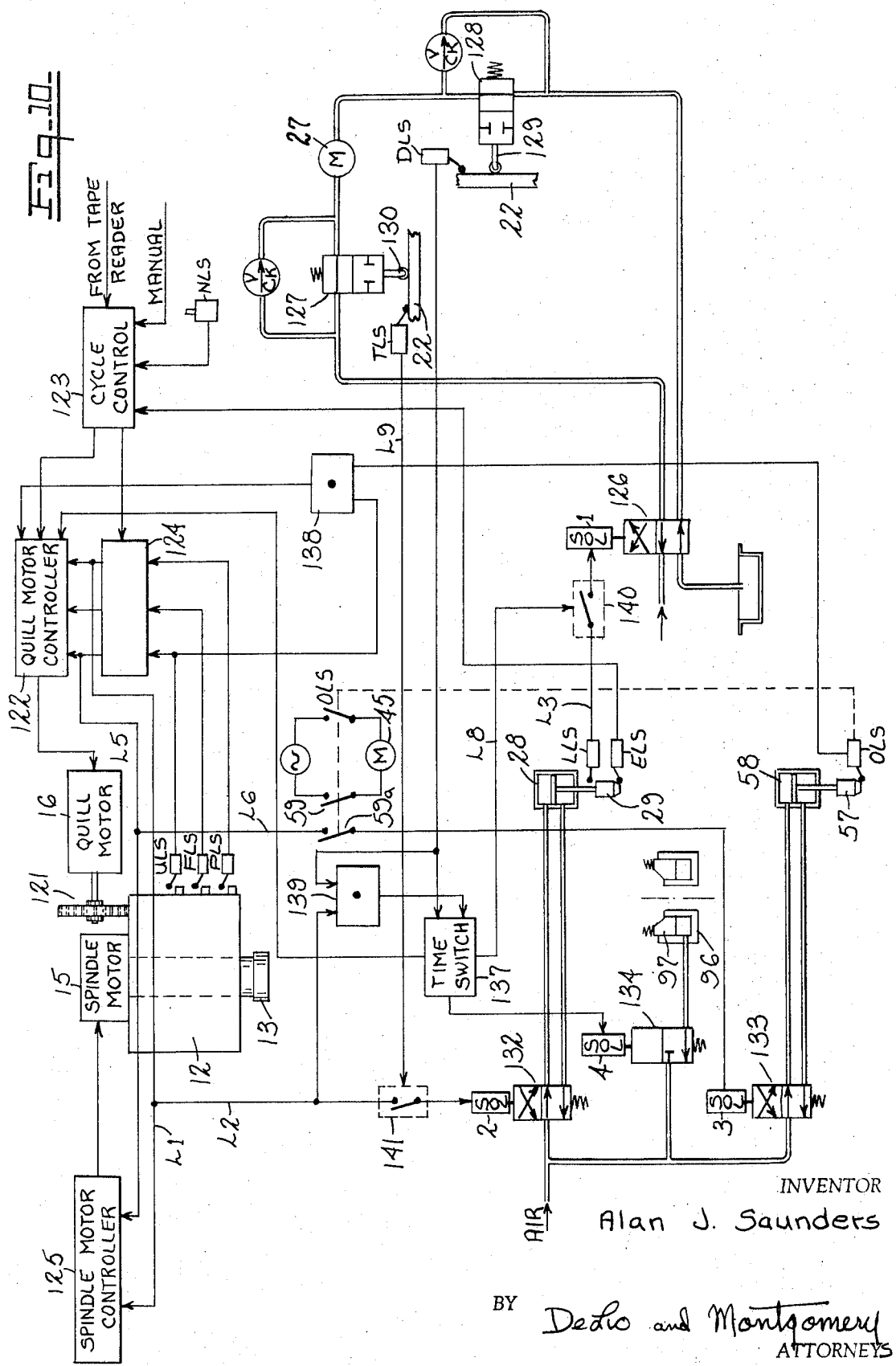

United States Patent Office 3,526,033
Patented Sept. 1, 1970

3,526,033
MACHINE TOOL WITH TOOL CHANGER
Alan J. Saunders, Manchester, Conn., assignor to Pratt & Whitney Inc., West Hartford, Conn., a corporation of Delaware
Filed Sept. 19, 1967, Ser. No. 668,769
Int. Cl. B23q 3/157
U.S. Cl. 29—568                                                  24 Claims

ABSTRACT OF THE DISCLOSURE

This disclosure relates to a machine tool having facility for interchanging tools with a vertical spindle. A rotatable tool holding magazine is carried on the head of the machine and is swingably mounted thereon to a tool storage position or a tool change position beneath the spindle to accept a tool from the spindle or allow the spindle to accept a tool from the magazine.

---

This invention relates to machine tools and more particularly relates to machine tools having facility for automatic change of cutting tools.

This invention relates to a machine tool particularly of the vertical spindle type having self-contained means for changing tools upon command. The invention is particularly adaptable for machines such as drill presses and jig borers which may also have straight milling capability.

In one form of the invention a tool changing mechanism is carried on the vertically reciprocal head of the machine in fixed relation to the spindle thereof. The tool changing mechanism basically comprises an indexable magazine in the form of a disc or plate having slots entering from its outer periphery, and carrying tools in the slots. This tool change mechanism is carried on linkages so that upon command it may be swung to a position directly below the spindle with substantially final linear motion to accept a previously used tool and then to present a new tool to the spindle which accepts the new tool without the necessity of any intermediaries such as a wrenching device or change arm. The invention further comprises new and improved features for locking and releasing a tool in the tool carrier in order to facilitate tool change and reduce the time of tool change.

An object of this invention is to provide a new and improved tool changing mechanism for a machine tool.

Another object of this invention is to provide a new and improved tool carrier for a machine tool.

Another object of this invention is to provide a new and improved mechanism for storing tools and presenting such stored tools in a predetermined order to the spindle of a machine tool.

A further object of this invention is to provide a tool of the type described which has new and improved means for lockably retaining a tool in the tool carrier and releasing said locking means to allow the spindle to directly accept a machine tool from the tool carrier.

Other objects and advantages of the invention will hereinafter in part be made apparent and hereinafter in part pointed out.

The features of the invention which are believed to be novel are particularly pointed out and distinctly claimed in the concluding portion of this specification. However, the invention both as to its organization and operation, together with further objects and advantages thereof may best be appreciated by reference to the following detailed description taken in conjunction with the drawings in which:

FIG. 1 is a front elevation of a machine tool embodying the invention;

FIG. 2 is an enlarged view of a portion of FIG. 1 showing the relationship of the tool change mechanism to the head of the machine;

FIG. 3 is a plan view seen from the top of the mechanism of FIG. 2;

FIG. 4 is a sectional view seen in the plane of lines 4—4 of FIG. 3;

FIG. 5 is a view seen in the plane of lines 5—5 of FIG. 4;

FIG. 10 is a diagram in functional block and schematic form to exemplify a tool change operating cycle.

Figure 6:
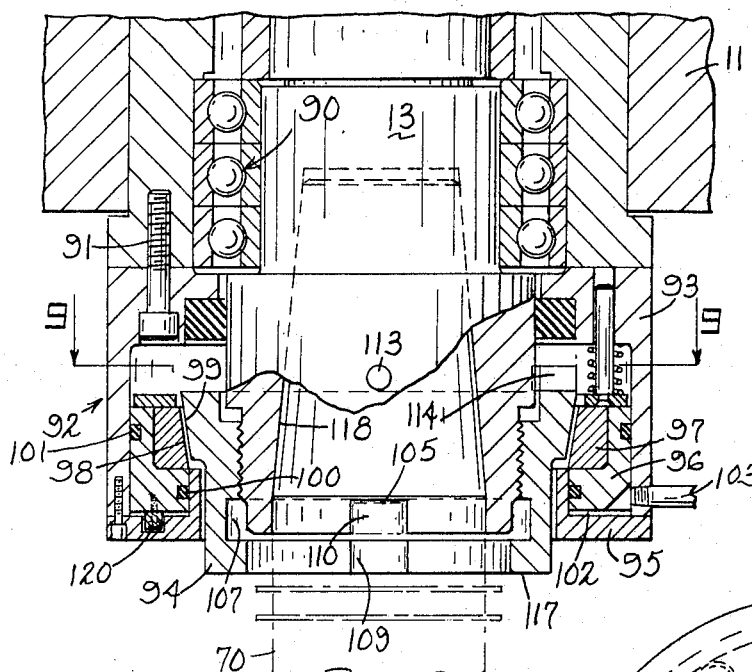
FIG. 6 is a view in section of the spindle of the machine.

A machine tool, such as a drill press, which may embody the invention is generally indicated by the reference numeral 10.

Machine 10 comprises a head 11 vertically movable on ways (not shown) in a conventional manner. Mounted within head 11 is a quill 12 and spindle 13. The quill is vertically movable within head 11 and spindle 13 is rotatable within quill 12. Motors 14, 15 and 16 are provided for rotating the spindle 13, elevating head 11, and raising and lowering quill 12, respectively.

Work to be machined is positioned on a bed 10a movable along one axis which is perpendicular to movement of a saddle beneath bed 10a (not shown) along another axis.

As more clearly shown in FIGS. 2 and 3, a tool change mechanism 17 is mounted to head 11 at a recess 18 on the side thereof. A bracket 19 is rigidly secured to the side of head 18 as by means of bolts 20. Pivotally mounted to bracket 19 as by means of a pin 21 is a first link 22. Pivotally mounted to bracket 19, as by means of a pin 23, is a second link 24 having affixed thereto a gear segment 25. Gear 25 is in meshing engagement with a pinion 26 on the shaft of a drive motor 27, also carried on bracket 19 at extension 19a thereof. Further mounted to bracket 19 is an air cylinder 28 adapted to operate a latch pin 29 received in a housing 30, also carried on bracket 19. Latch pin 29 is adapted to be inserted into an aperture 25a in gear 25 to prevent the rotation thereof, and further hold assembly 17 in the position shown in full line in FIG. 2.

Link 24 is pivotally connected to an upper bracket 31 on tool change mechanism 17 between a pair of ears 32 thereof by means of a pin 33. Link 22 is pivotally connected to mechanism 17 between similar ears by means of a pin 34. The center lines of links 22 and 24 reside in a common vertical plane. With this arrangement tool change mechanism 17 is adapted to be swung downwardly to the position shown in dotted line in FIG. 2 beneath spindle 13. It is to be noted that the pivotal connections of links 22 and 24 to bracket 20 and to tool change mechanism 17 all reside in the same plane.

Tool change mechanism 17 comprises a magazine in the form of a generally circular plate-like member 35 (FIG. 3) having a plurality of recesses 36 equi-angularly defined therein from the outer periphery. The recesses 36 are of generally circular shape for a major portion thereof further defined by tapered edges 37 to facilitate insertion of a tool therein. The magazine further includes a hub portion 38 (FIG. 4) rotatably mounted about a shaft 39 through a ball bushing 40. Affixed to hub portion 38 as by means of a plurality of bolts is a pulley 42. Affixed to the upper end of shaft 39 as by pin 43 is bracket 31 including platform 44. The ears for the pivotal mounting of links 22 and 24 are carried on platform 44. Also mounted to platform 44 is a motor 45 having a shaft 46 extending into a uni-directional or over-running clutch 47 which in turn is carried in a recess 48 in a driven member 49. Attached to the driving member of the clutch is a shaft 50 extending into shaft-mounting plate 51. Mounted to driven member 49 about shaft 50 is a pulley 52 adapted to rotate about shaft 50 and connected to pulley 42 by means of a belt 53. Shaft 50 acts as a pivot for driven member 49 and pulley 52. Shaft-mounting plate 51 depends from platform 44 and is connected thereto as by means of a vertical bridging member 55 (FIG. 2). A plurality of apertures 56 corresponding in number to the number of recesses 36 modified by the ratio of pulleys 42 to 51 are equi-angularly spaced about driven member 49. In the illustrated embodiment three apertures 56 are provided. The apertures 56 are adapted to receive a lock pin 57 operated by an air cylinder 58 carried on platform 44. Depending from and carried by plate 51 are limit switches 59 and 60. Limit switch 59 is adapted to be operated by a plurality of lugs 61 positioned around hub 38 in a number of equi-angular positions equal to or corresponding to the recesses 36. Limit switch 60 is adapted to be operated by a lug 62 on hub 38 which determines a homing position, or the number one tool position of plate 35.

Plate 35 is rotatable about shaft 39 and is further spring-loaded about ball bushing 40 to allow downward movement of plate 35 under conditions hereinafter described. The bias of a spring 63 may be adjusted by means of a collar 65 threaded on the bottom end of shaft 39. Adjusting screw 64 is provided to lock collar 65 in a given position. A switch NLS is adapted to sense downward movement of plate 35 having its arm normally in contact with the top of pulley 42.

A cutting tool holder 70 is exemplified in dashed line in FIG. 4 in one of recesses 36. Such tool holder has a tapered portion 71, body portion 72 having locking ears 105 extending therefrom, and receives snap ring spacers 73 and 74 in grooves provided therefor in body portion 72. The rings 73 and 74 are spaced apart a dimension to bridge a specified dimension across the thickness of plate 35. The upper portion of plate 35 is recessed as at 75 to receive upper ring 73. Secured to the bottom of plate 35 in predetermined relation to each of recesses 35, is a spring detent plate 78 which functions to lock a tool in one of recesses 36. The detent plate is in the general form of a cantilevered leaf spring and is secured at one end thereof as by means of set screws 79 and spring washers 80 to plate 35. With this arrangement the detent plate is biased towards plate 35. At the other end thereof, plate 78 is formed with a substantially semi-circular recess 81 of slightly larger radius than the radius of ring 74 which is received therein. The free ends of plate 78 are also formed with a depending lip 82.

When a tool holder 70, as exemplified in FIG. 4, is inserted into a recess 36, the lower ring 74 slides over the lips 82 until the body portion of a tool holder is fully received in recess 36. At this time, ring 74 is sufficiently received in recess 81 that detent plate 78 moves upwardly under the bias of spring washer 80 and edges or ears 84 thereof now overlap and interfere with ring 74 and prevent outward movement of tool 70 unless detent plate 78 should be depressed to permit removal of tool holder 70. Such depression of tool holder 70 is accomplished by a downward force on a ball 86 associated with each recess 36 in a socket 87 provided therefor. the ball 86 as hereinafter described is acted upon by quill 12.

It will be noted that the detent plates are so formed with ears 84 which overlie the ring 74 that when a tool holder 70 is in a fully inserted position in a recess 36, the ears prevent removal of the tool holder therefrom unless the detent plate 78 is depressed downwardly.

A detent plate 78 is provided in association with each recess 36 and a ball 86 and socket 87 is provided in association with each detent plate.

Figure 7:
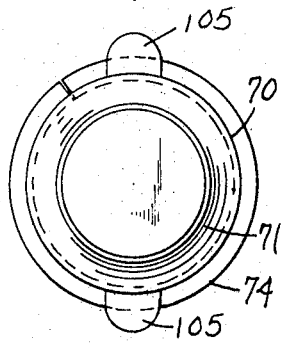
FIG. 7 is a view of a tool holder seen from the top thereof.
Figure 8:
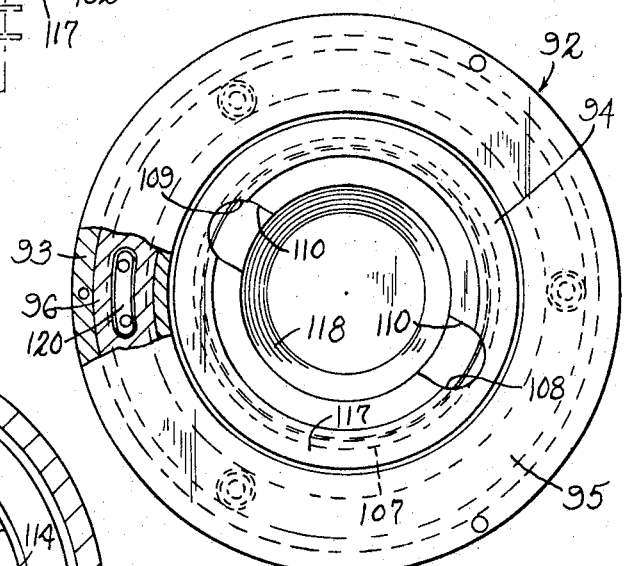
FIG. 8 is a view of the spindle of FIG. 6, seen from the bottom thereof and partially cut away.
Figure 9:
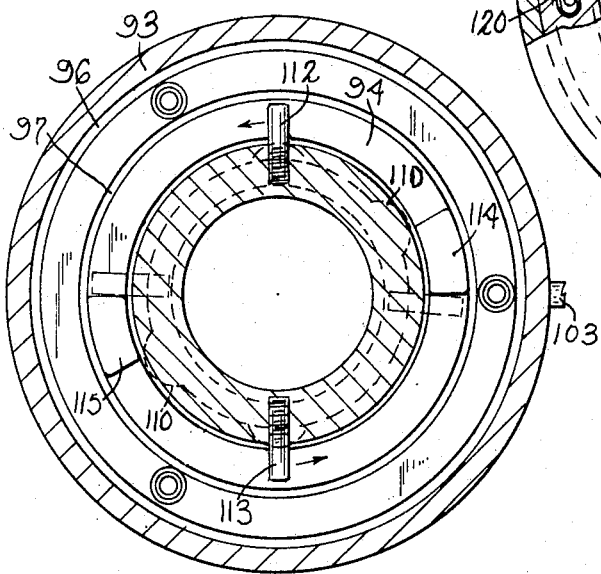
FIG. 9 is a view seen in the plane of lines 9—9 of FIG. 6.

Reference is now made to FIGS. 6–9. The quill 12 is longitudinally movable in head 11 and spindle 12 rotatable within quill 12 on bearing assemblies 90 in a conventional manner. Secured to the end of quill 12 as by means of a plurality of bolts 91 is a tool clamp assembly generally indicated by the reference numeral 92. Assembly 92 comprises a housng adapter 93 which receives therein a nut 94 threaded to spindle 13. Housing adapted 93 further includes an end plate 95. Received within adapter 93 and end plate 95 is a clamp ring 96 carrying a ring 97 of high friction material having a tapered surface 98 adapted to frictionally engage a tapered surface 99 on nut 94. Circular air seals 100 and 101 are provided between end plate 95, housing adapter 93 and clamp ring 96 to define an air chamber 102. When air under pressure is introduced into chamber 102 as through an opening 103, clamping ring 96 with ring 97 thereon moves up and engages surfaces 99 of spindle nut 94. Each of the tool holders 70 (FIG. 7) have diametrically opposing ears or lugs 105 thereon. Defined in the internal peripheral surfaces of nut 94 is an annular groove or slot 107. Also defined in nut 94 at the bottom thereof is a pair of recesses 108 and 109 adapted to receive therethrough ears 105 to permit ears 105 to move into the slot 107.

To insert a tool holder 70 in spindle 13, nut 94 is positioned with respect to spindle 13 such that recesses 108, 109 are aligned with a pair of diametrically opposed slots 110 in the spindle. In this position, stop pins 112, 113 carried by the spindle engage lugs 114, carried on nut 94, to effect this relative positioning. Nut 94 may move relative to spindle 13 between the positions of pins 112 and 113 as shown in full and in broken line in FIG. 9. In one position the slots 108 and 109 in nut 94 are aligned with slots 110 and 111 in spindle 13.

Next, the spindle and quill are moved downwardly while rotating at a lower speed over a tool holder in plate 35. In this manner, nut 94 allows the tapered portion of the tool holder to pass therein and by virtue of the combined downward and rotary movement of spindle 13 the ears 105 are located in the recesses 108, 109 in nut 94 and slots 110 and 111 in spindle 13. The material of plate 35 is selected to have a coefficient of friction such that the bottom surface 117 of nut 94 turn easily thereon. For example, plate 35 may be aluminum.

Next, fluid pressure is introduced through port 103 to move clamping ring 96 upwardly and engage nut 94 to quill 12. Then the spindle is rotated and nut 94 rises slightly with respect to the spindle. This turns ears 105 in slot 107 and also raises the taper of the tool holder into frictional engagement with the internal taper 118 of the spindle. A key 120 carried by clamp ring 96 prevents relative rotation of the quill and clamp ring 96.

At this time, the tool holder is locked in the spindle, the mechanism 17 is withdrawn to the position shown in FIG. 1, and the tool is ready for a machining operation.

When the tool holder ears 105 are received in slots 110 in the spindle they are locked against relative rotation therewith. Then when nut 94 is rotated to move upwardly with respect to spindle 13, nut 94 will engage the underside of ears 105 and force the tapered shank of the tool holder into the internally tapered bore of the spindle.

In effecting a tool change, the quill is first brought to a tool change position, then the tool change magazine is brought to the position shown in broken line in FIG. 2 to receive the used tool. Next, nut clamp 97 is made to engage nut 94, and spindle 12 is rotated to release the ears 105 of the tool holder therein. With the released tool in the magazine, the quill is moved upwardly a predetermined distance. Then the magazine is indexed to present another tool holder. Then the quill is moved downwardly over the tool holder while slowly rotating to engage ears 105. Then ring 97 engages nut 94 and as the spindle is rotated, locks the tool holder therein. The quill 12 bearing on the boll 86 depresses detent plate as shown in broken line in FIG. 4. Next, the magazine is swung outwardly and upwardly to its retracted position shown in FIG. 2 and the machine is ready to perform a new cycle of operation.

Reference is now made to FIG. 10 which illustrates in functional schematic and block form a network and apparatus for effecting and controlling a tool change cycle.

Quill 12 is raised and lowered by motor 16 through a rack and pinion assembly 121. The position of quill 12 is sensed by an upper limit switch ULS, a feed limit switch FLS and a position limit switch PLS. These switches when actuated control the operation of quill motor 16 through controller 122 during a tool change cycle. These switches effect the operation of quill motor only during a tool change cycle as signified by cycle control network 123 enabling a gate network 124. Cycle control 123 initiates a tool change cycle upon receipt of a signal from a record medium such as a tape reader, not shown. Spindle 13 is driven at variable speeds by motor 15 under command of controller 125.

The tool magazine is moved from a storage position to a tool change position by hydraulic motor 27 controlled by two-way valve 126 in turn controlled by a solenoid 1SOL. The control for motor 27 further includes up and down deceleration valves 127 and 128 which decrease the flow of hydraulic fluid to motor 27 as the magazine approaches its end positions. As the magazine approaches its lower end position link 22 or a cam surface carried thereby (not shown) bears against plunger 129 of valve 128 and decreases the rate of flow of fluid to motor 27, finally cutting off flow as the full lower position is reached. In a similar manner plunger 130 of valve 127 is acted upon by line 22 or another cam surface carried thereby (not shown) as the magazine approaches the full up position.

A pneumatic circuit includes lock pin cylinder 28, latch pin cylinder 58 and clamp ring 97. Cylinder 28 is operated by a two-way valve 132 under control of a solenoid 2SOL. Cylinder 58 is operated by a two-way valve 133 under control of a solenoid 3SOL. Clamp ring 97 is operated by a valve 134 under control of a solenoid 4SOL. The position of latch pin 29 is sensed by limit switches LLS and ELS. The position of lock pin 57 is sensed by limit switch OLS.

The magazine is indexed by motor 45 when switch LLS is closed (lock pin 57 retracted) and switch 59 is closed. Switch 59 is closed until its strikes a dog 61.

When an index limit switch 59 is contacted, index motor 45 is de-energized and solenoid 3SOL is de-energized, reversing valve 133 and causing cylinder 58 to extend shotpin 57 into an aperture 56 in plate 49 to again contact switch OLS. This locks magazine 17 in position to present a new tool to the spindle.

Switches DLS and TLS carried on bracket 19 or, alternatively, head 11 are contacted by link 22 to signify when the magazine is in the full down and up positions, respectively.

In a tool change cycle the quill is positioned in a given position referred to as a tool change position which is in a predetermined relationship to the tool changer when it is in the down position. Prior to a tool change operation, the quill may be in one of several positions. If the quill is positioned above the tool change position, it is moved downwardly in a rapid traverse to feed limit switch FLS (FIG. 10) and then fed down at a lower speed, for example, 20″ per minute to position limit switch PLS. When switch PLS is actuated downward feeding of the quill is halted and the quill is now in a tool change position.

If the quill is located between the feed and position limit switches FLS and PLS, respectively, then the quill is fed downwardly at the previously mentioned slow rate until the position limit switch PLS is actuated. The signals from switches FLS and PLS are applied to controller 122.

If the quill is located below the switches FLS and PLS motion then consists of rapid traverse upward to feed limit switch FLS, reversal of feed and feed down at the lower speed to the position limit switch PLS. The quill feed will stop when the position limit switch is actuated. Contacting of position limit switch PLS will also cause the spindle speed to be reduced to a low speed, which may be approximately 60 r.p.m. counterclockwise rotation.

When limit switch PLS is closed indicating that the quill is in a tool change position, solenoid valve 2SOL is energized to port fluid through valve 132 to cylinder 28 which retracts latch pin 29 from gear 25 through latch solenoid valve 125. As cylinder 28 reaches the end of its stroke, pin 29 contacts latch limit switch LLS. Switch LLS will energize the up-down solenoid valve 1SOL which sets valve 126 to a position which causes hydraulic motor 27 to rotate in a direction which will bring the tool changer down from the position shown in full line in FIG. 2 to the position shown in dotted line in FIG. 2. Solenoid 1SOL will remain energized so long as latch pin 29 is retracted. Motion of the magazine downwardly is decelerated and halted by valve 128.

In FIG. 10 the cycle control for simplicity of disclosure is shown in functional block and schematic form. It is to be understood that the various switches that are shown may take any convenient form and may be relay controlled switches semiconductor devices or any other suitable device. Assume that the quill is located above feed limit switch FLS. Upon command from a tape reader or a manual pushbutton control to initiate a tool change cycle, the quill is fed down rapidly until feed limit switch FLS is closed, at which time the quill will feed down at a slower rate until position limit switch PLS is closed, at which time the quill ceases downward movement.

At this time, the quill with the spindle therein, is positioned to have the tool in a spindle accepted into the open position in the magazine. When switch PLS is closed, a signal is applied over line L1 to the spindle motor controller to reduce the speed of the spindle motor to a low speed at counterclockwise rotation. At the same time, over line L2, connected to line L1 latch solenoid valve 2SOL will be energized to port fluid to latch cylinder 28 through valve 132 which retracts pin 29 to unlock the mechanism from bracket 19. When pin 29 reaches the end of its full retract position it operates latch limit switch LLS which through line L3 energizes up-down solenoid 1SOL to supply fluid to motor 27 through deceleration valve 128 causing hydraulic motor 27 to rotate in a direction to lower the magazine. As the magazine reaches the full down position, down limit switch DLS is contacted by link 22 to indicate that the magazine is in a down position. At this time solenoid 1SOL remains energized inasmuch as pin 29 remains in its retracted position. When down limit switch DLS is closed it energizes solenoid 4SOL through a time switch 137. When time switch 137 times out after a brief interval of time it applies a signal to quill motor controller 122 to cause the quill motor to traverse rapidly upwardly. While switch 137 is timing clamp ring 97 is locked to the spindle nut and as the spindle rotates approximately 90 degrees the ears 105 on the tool holder in the spindle align with the recesses 108 in 109 in lock nut 94.

Then as the quill traverses upward rapidly, the tool holder is retained in plate 35 as shown in dotted line in FIG. 2.

At this point, the tool magazine has accepted a tool from the spindle, and the quill with the spindle therein has been raised to clear the tapered shank of the tool and permit the magazine to be indexed.

When the quill traverses to the point where it contacts up limit switch ULS a signal is applied over line L5 to spindle motor controller 125. Spindle motor controller 125 then reverses spindle motor in order that it may accept a new tool. At the same time a signal is applied over line L6 connected to line L5 to solenoid 3SOL to energize solenoid 3SOL to cause valve 133 to port fluid to cylinder 58 which retracts lock pin 57 and frees the magazine for rotation. As pin 57 is retracted, switch OLS is closed which closes the circuit to indexing motor 45. Motor 45 is also of the type which includes an integral brake so that it will immediately stop when de-energized. Index motor 45 rotates the magazine until index limit switch 59 is contacted and opened by the next dog 61 on the magazine 38. This de-energizes motor 45 and also opens a switch 59a in line L6 to de-energize solenoid 3SOL. When solenoid 3SOL is de-energized cylinder 58 extends lock pin 57 into the next aperture 56 in plate 35. This locks the magazine in the next indexed location to present the next tool to spindle 13. When the lock pin 57 is again extended it contacts limit switch OLS which applies a signal to a coincident circuit 138 together with a signal from up limit switch ULS. Coincident circuit 138 then applies a signal to quill motor controller 122 to cause quill motor 16 to rapid traverse quill 12 downwardly until feed limit switch FLS is contacted at which time the feed rate is reduced to a low speed. At this time, the quill is feeding down slowly and the spindle is rotating slowly therein. The quill and spindle will then move downwardly over the tapered portion of the next tool holder in the magazine and the combined downward and rotative movement of the spindle will locate the ears 105 of the tool holder in the recesses 108 and 109 of nut 94 and recesses 110 and 111 of spindle 13. Then when position limit switch PLS is contacted, with the magazine in the down position, time switch 137 again receives a signal from a coincident circuit 139 which receives as its input signals from switch PLS and DLS. Time switch 137 will then energize solenoid 4SOL to actuate the clamp. When clamp ring 97 engages nut 94 with spindle 13 rotating the nut will rotate and in so doing will force shank of the tool holder 70 into the tapered bore of spindle 13. Then when time switch 137 times out solenoid 4SOL is de-energized, releasing clamp ring 97. Also a signal is applied over line L8 to open a switch 140 and de-energize solenoid 1SOL. Fluid is then ported through valve 126 to motor 57 through deceleration valve 127 to retract the magazine toward its storage position. When the magazine reaches this position shown in full line in FIG. 2, link 22 engages limit switch TLS which applies a signal over line L9 to a switch 141 in line L2 and de-energizes solenoid 2SOL. This causes cylinder 132 to port fluid to valve 128 which extends latch pin 29 into aperture 32 in gear 25 and thereby locks the magazine in the up position. When latch pin 29 is extended it engages limit switch ELS which applies a signal to cycle control to signify that a tool change cycle is complete.

The tool has now been changed and the machine tool is ready for operation with the new cutting tool therein.

When the quill and spindle move down over a tool holder in plate 35 to engage such tool holder and the tool is not engaged, that is, the ears 105 thereof are not received in the recesses in the lock nut, the quill and spindle will force plate 35 down against the bias of spring 63. When plate 35 has moved a predetermined distance a limit switch NLS (FIGS. 4 and 10) is actuated which applies a signal to the cycle control ordering a recyling. When recycle limit switch NLS is actuated, the quill motor is caused to raised the quill up to feed limit switch FLS, reverse direction, and feed down at a slow rate to engage the tool and actuate position limit switch PLS. This recycling may continue until the position limit switch PLS is contacted.

It may thus be seen that the objects of the invention set forth as well as those made apparent from the preceding description are efficiently attained. While a preferred embodiment of the invention has been set forth for purposes of disclosure, other embodiments thereof as well as modifications to the disclosed embodiments may occur to those skilled in the art. Accordingly, the appended claims are intended to cover all embodiments of the invention which do not depart from the spirit and scope thereof.

What is claimed is:

1. In a machine tool, a head, a vertically positionable tool operator in said head, a tool storage magazine comprising a plate-like member having a plurality of tool sockets recessed from the periphery thereof, said member adapted to slidingly receive tools in and slidingly yield tools from said sockets, linkage means pivotally mounting said magazine to said head for arcuate movement of said magazine between a storage position above said tool operator and a position below said tool operator to receive a tool in said operator in said sockets and present a tool to said tool operator and means for moving said magazine between said positions, said linkage means being constructed and arranged to maintain said plate-like member in a generally horizontal plane in the storage position, the position below said tool operator, and during said arcuate movement.

2. The tool of claim 1 wherein said magazine is rotatable, and further including means for rotating said magazine.

3. The tool of claim 2 further including means for locking said magazine in predetermined positions.

4. The machine tool of claim 1 wherein said magazine and linkage means are so constructed and arranged that said matrix in moving from a storage position to a position to place one of said tool supports below said tool operator moves through an angle of essentially 90°.

5. In a machine tool, a head, a vertically positionable tool operator in said head, a tool storage magazine comprising a plate-like member having a plurality of tool sockets recessed from the periphery thereof, said member adapted to slidingly receive tools in and slidingly yield tools from said sockets, linkage means pivotally mounting said magazine to said head for arcuate movement of said magazine between a storage position above said tool operator and a position below said tool operator to receive a tool in said operator in said sockets and present a tool to said tool operator and means for moving said magazine between said positions, said linkage means comprising a pair of parallel links pivoted at one end thereof to a bracket on said head and at the other end thereof to said matrix, the points of pivoting of said links to said bracket being arranged so that when said links are in a vertical position, one of said recesses in said plate-like member is directly below said tool operator.

6. The machine tool of claim 5 further including a gear segment secured to one of said links, and a power driven pinion meshing with said gear segment for moving said magazine.

7. The machine tool of claim 6 further including means for preventing rotation of said gear segment on locking said magazine in a storage position.

8. In a machine tool, a head, a vertically positionable tool operator in said head, a tool storage magazine, linkage means pivotally mounting said magazine to said head for vertical arcuate movement of said magazine between a storage position above said tool operator and a position to place one of said tool supports directly below said tool operator while maintaining said magazine horizontal throughout said movement, said magazine comprising a plate-like member having a plurality of tool supports comprising equi-angularly spaced recesses defined in the periphery thereof adapted to receive a tool with vertical upper and lower ring-like members spaced apart substantially the thickness of said plate-like member.

9. The machine tool of claim 8 wherein said plate-like member is relieved about said recesses in the upper surface thereof to provide seats for the upper ring-like members of the tools.

10. The machine tool of claim 8 further including means associated with each of said recesses for locking a tool therein, said further means comprising a resilient member fastened at one end thereof to the underside of said plate-like members, the other end thereof being formed with spaced apart arms enclosing more than 180° arranged to fit about a lower ring-like member on a tool and prevent withdrawal of the tool from its tool support, said resilient member being biased toward a position to prevent withdrawal, and means carried by said plate-like member intermediate the ends of each of said resilient member to depress said resilient member and allow a tool to be removed from a recess.

11. The machine tool of claim 8 further including means for rotating said magazine to predetermined positions, and means for locking said magazine in said positions.

12. A machine tool, comprising a quill, a tool operator vertically and rotatably movably carried by said quill, said tool operator including means for receiving and locking a tool therein and unlocking a tool therein for removal therefrom, means predetermining a position of said tool operator to receive and release a tool, a tool storage magazine, linkage means pivotally mounting said magazine to said frame for movement between a storage position above said tool operator and a position below said tool operator to accept a tool therefrom and present a tool thereto, said magazine comprising a plate-like member rotatable about a central hub portion, said plate-like member having a plurality of tool seats recessed from the periphery thereof, said magazine and said linkage means being constructed and arranged to arcuately move in a vertical plane so that said magazine moves to accept a tool from said tool operator in a determined position in one of said recesses.

13. The machine tool of claim 12 further including means responsive to said magazine receiving a tool in said tool operator to cause said tool operator to release said tool and move upwardly therefrom.

14. The machine tool of claim 13 further including means responsive to predetermined upward movement of said tool operator for indexing said magazine to present a new tool to said tool operator.

15. The machine tool of claim 14 further including means responsive to indexing of said magazine to produce downward movement of said tool operator to accept a new tool presented by said magazine.

16. The machine tool of claim 15 further including means responsive to non-acceptance of said presented tool for causing upward movement of said tool operator and following downward movement thereof to accept said new tool.

17. The machine tool of claim 15 further including means responsive to acceptance of said new tool for causing said magazine to move to a storage position.

18. The machine tool of 15 further including means for locking each tool in said magazine, and means carried by said magazine and actuated by contact of said tool operator thereon for releasing a tool from the locking means associated with the presented tool.

19. The machine tool of claim 12 wherein the change in direction of said magazine is at a minimum as said magazine moves toward and away from a tool change position.

20. A machine tool, comprising a head, a tool operator vertically and rotatably movably carried in said head, said tool operator including means for receiving and locking a tool therein and unlocking a tool therein for removal therefrom, means predetermining a position of said tool operator to receive and release a tool, a tool storage magazine, linkage means pivotally mounting said magazine to said head above said tool operator for movement between a storage position above said tool operator and a position below said tool operator to accept a tool therefrom and present a tool thereto, said magazine comprising a plate-like member rotatable about a central axis, said plate-like member having a plurality of tool seats recessed from the periphery thereof, said magazine and said linkage means being constructed and arranged to arcuately move in a vertical plane so that said magazine moves to accept a tool from said tool operator in a determined position in one of said recesses.

21. A machine tool, comprising a head, a tool operator vertically and rotatably movably carried in said head frame, said tool operator including means for receiving and locking a tool therein and unlocking a tool therein for removal therefrom, means predetermining a position of said tool operator to receive and release a tool, a tool storage magazine, linkage means pivotally mounting said magazine to said head above said tool operator for movement between a storage position above said tool operator and a position below said tool operator to accept a tool therefrom and present a tool thereto, said magazine comprising a plate-like member rotatable about a vertical axis, said plate-like member having a plurality of tool seats recessed from the periphery thereof, said magazine and said linkage means being constructed and arranged to arcuately move in a vertical plane so that said magazine moves to accept a tool from said tool operator in a determined position in one of said recesses, a shaft providing said vertical axis, a platform non-rotatably mounted to said shaft, said magazine rotatably mounted to said shaft, magazine drive means carried on said platform, means for locking said magazine to prevent rotation thereof, and means responsive to release of said locking means for energizing said drive means.

22. The machine tool of claim 21, wherein said locking means comprises a driven member rotatable by said drive means, said driven member having a plurality of apertures therein each associated with a recess in said magazine, a pin normally inserted into said apertures, and means responsive to said tool operator releasing a tool to said magazine for withdrawing said pin.

23. The machine tool of claim 21 further including means for de-energizing said drive means upon predetermined rotation of said magazine and inserting said pin into an aperture in said driven member.

24. The machine tool of claim 21 further including a first pulley mounted to said driven member, a second pulley mounted to said magazine, on a belt interconnecting said pulleys.

References Cited

UNITED STATES PATENTS

| | | | |
|---|---|---|---|
| 2,901,927 | 9/1959 | Morgan | 29—568 |
| 3,074,147 | 1/1963 | Miller | 29—26 |
| 3,292,235 | 12/1966 | Riedel | 29—26 |
| 3,191,260 | 6/1965 | Jorgensen | 29—26 |
| 3,271,853 | 9/1966 | Pfister | 29—568 |

FRANCIS S. HUSAR, Primary Examiner